US012151635B1

(12) United States Patent
Moran et al.

(10) Patent No.: US 12,151,635 B1
(45) Date of Patent: Nov. 26, 2024

(54) CURTAIN AIRBAG WITH PACKAGE MAINTAINING STRUCTURE

(71) Applicant: ZF Passive Safety Systems US Inc., Washington, MI (US)

(72) Inventors: Dylan Moran, Rochester Hills, MI (US); Avadhoot Paranjpe, Shelby Township, MI (US)

(73) Assignee: ZF Passive Safety Systems US Inc., Washington, MI (US)

( * ) Notice: Subject to any disclaimer, the term of this patent is extended or adjusted under 35 U.S.C. 154(b) by 0 days.

(21) Appl. No.: 18/453,625

(22) Filed: Aug. 22, 2023

(51) Int. Cl.
*B60R 21/232* (2011.01)
*B60R 21/201* (2011.01)
*B60R 21/213* (2011.01)
*B60R 21/235* (2006.01)
*B60R 21/237* (2006.01)

(52) U.S. Cl.
CPC .......... *B60R 21/201* (2013.01); *B60R 21/213* (2013.01); *B60R 21/232* (2013.01); *B60R 21/235* (2013.01); *B60R 21/237* (2013.01); *B60R 2021/23538* (2013.01); *B60R 2021/23547* (2013.01); *B60R 2021/2375* (2013.01)

(58) Field of Classification Search
CPC ... B60R 21/232; B60R 21/213; B60R 21/201; B60R 21/237; B60R 21/235; B60R 21/23138; B60R 21/233; B60R 21/231; B60R 21/262; B60R 2021/23538; B60R 2021/23547; B60R 2021/2375; B60R 2021/23316; B60R 2021/2617; B60R 2021/23308; D03D 1/02; D03D 11/02; D10B 2505/124

USPC ............................................ 280/730.2, 728.2
See application file for complete search history.

(56) References Cited

U.S. PATENT DOCUMENTS

| | | | |
|---|---|---|---|
| 6,517,110 B1 * | 2/2003 | Butters | B60R 21/2338 280/730.2 |
| 2005/0057023 A1 * | 3/2005 | Burton | B60R 21/232 280/730.2 |
| 2005/0087960 A1 * | 4/2005 | Gammill | B60R 21/232 280/730.2 |
| 2009/0051149 A1 * | 2/2009 | Kalandek | B60R 21/26 280/730.2 |
| 2012/0313352 A1 * | 12/2012 | Baumgartner | B60R 21/201 53/429 |
| 2015/0367801 A1 * | 12/2015 | Fukuda | B60R 21/201 53/442 |

(Continued)

FOREIGN PATENT DOCUMENTS

| | | | | |
|---|---|---|---|---|
| DE | 19940776 A1 * | 3/2001 | ......... | B60R 21/2176 |
| DE | 102010051796 A1 * | 5/2012 | .......... | B60R 21/201 |

(Continued)

*Primary Examiner* — Keith J Frisby
(74) *Attorney, Agent, or Firm* — Tarolli, Sundheim, Covell & Tummino LLP

(57) ABSTRACT

An apparatus for helping to protect an occupant of a vehicle includes a curtain airbag having a packaged condition in which the curtain airbag is rolled and/or folded to be installed along a roof rail in a vehicle. The curtain airbag is configured to be inflated and deployed along a side structure of the vehicle structure. The curtain airbag includes a channel configured to receive a package maintaining structure configured to enforce a predetermined configuration of the curtain airbag in the packaged condition.

14 Claims, 7 Drawing Sheets

(56) References Cited

U.S. PATENT DOCUMENTS

2016/0221526 A1* 8/2016 Santin Navarro .. B60R 21/2338
2022/0024403 A1* 1/2022 Kosten ................. B60R 21/201
2022/0332275 A1* 10/2022 Wold ................... B60R 21/213

FOREIGN PATENT DOCUMENTS

EP          0855315 A1 *  7/1998
KR       20100044617 A  *  4/2010

* cited by examiner

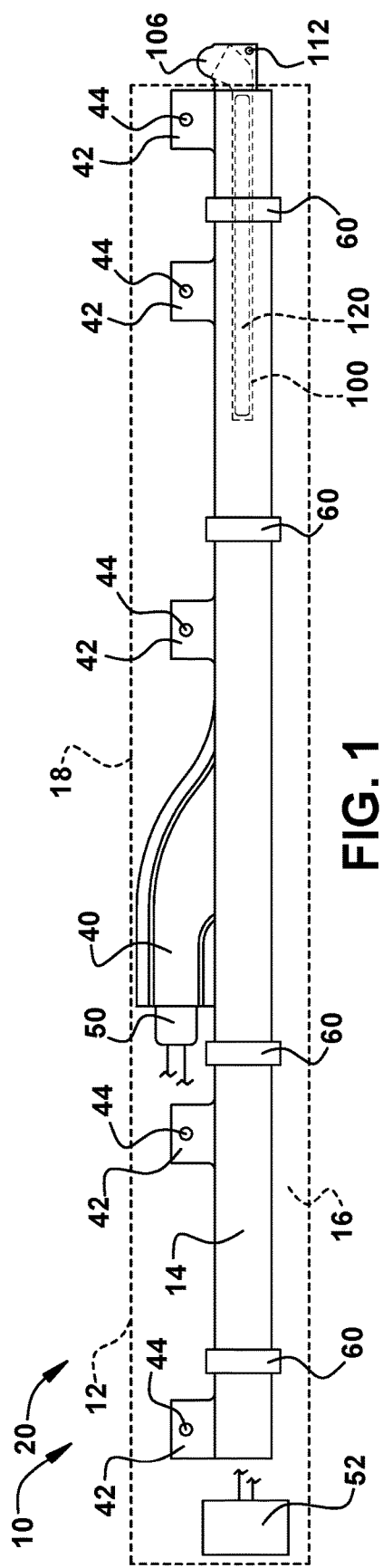
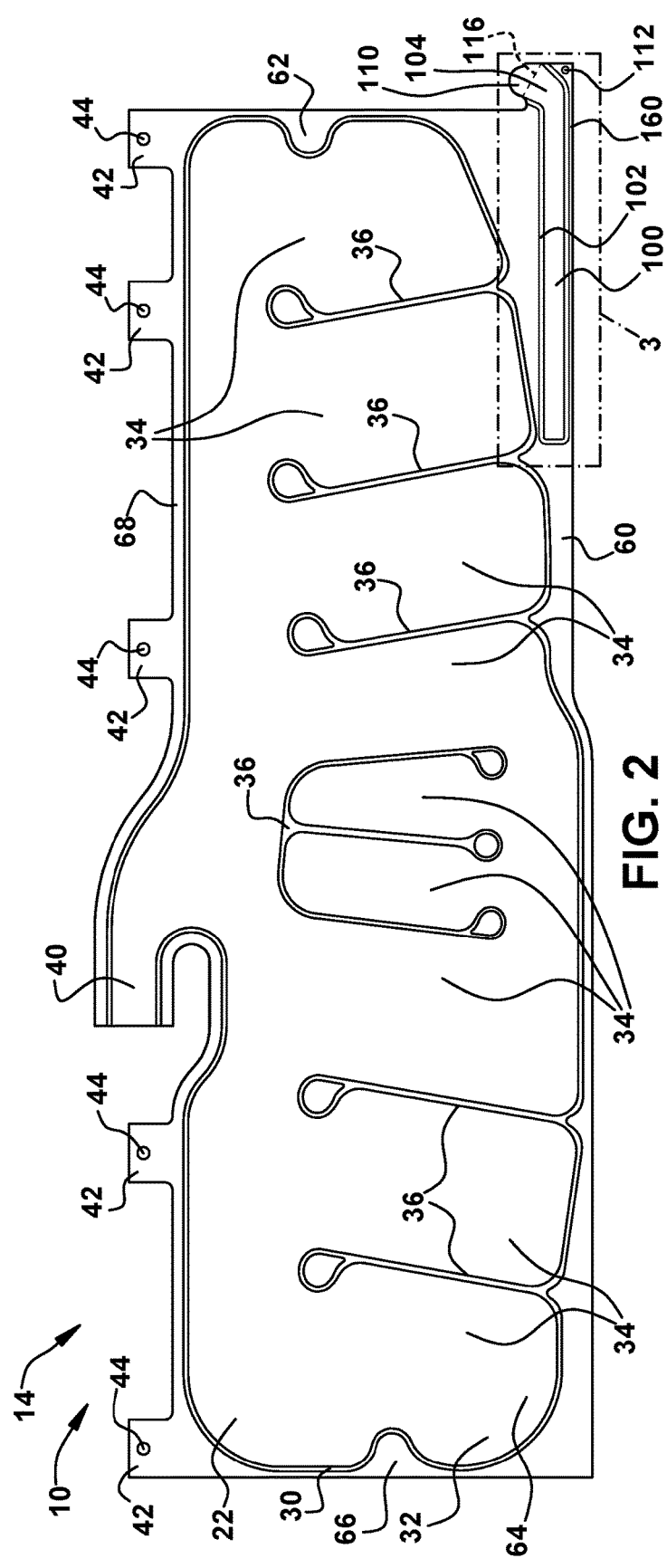

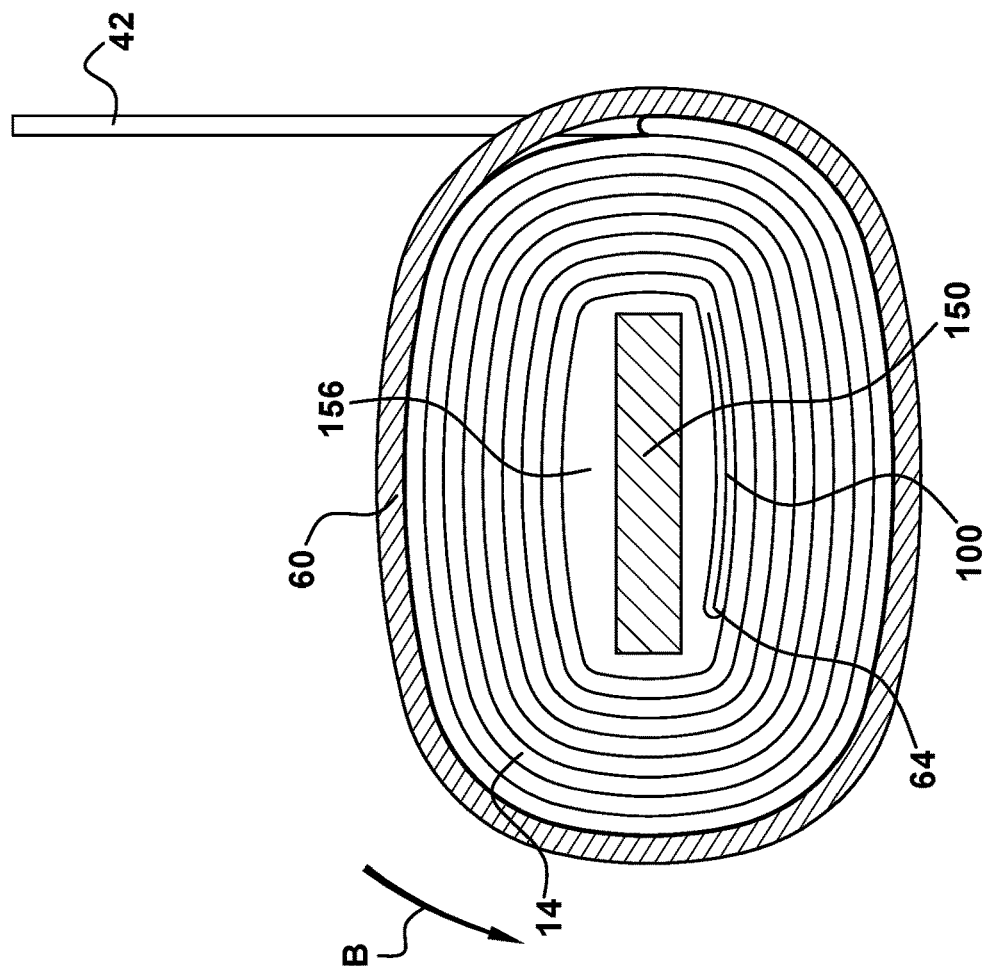
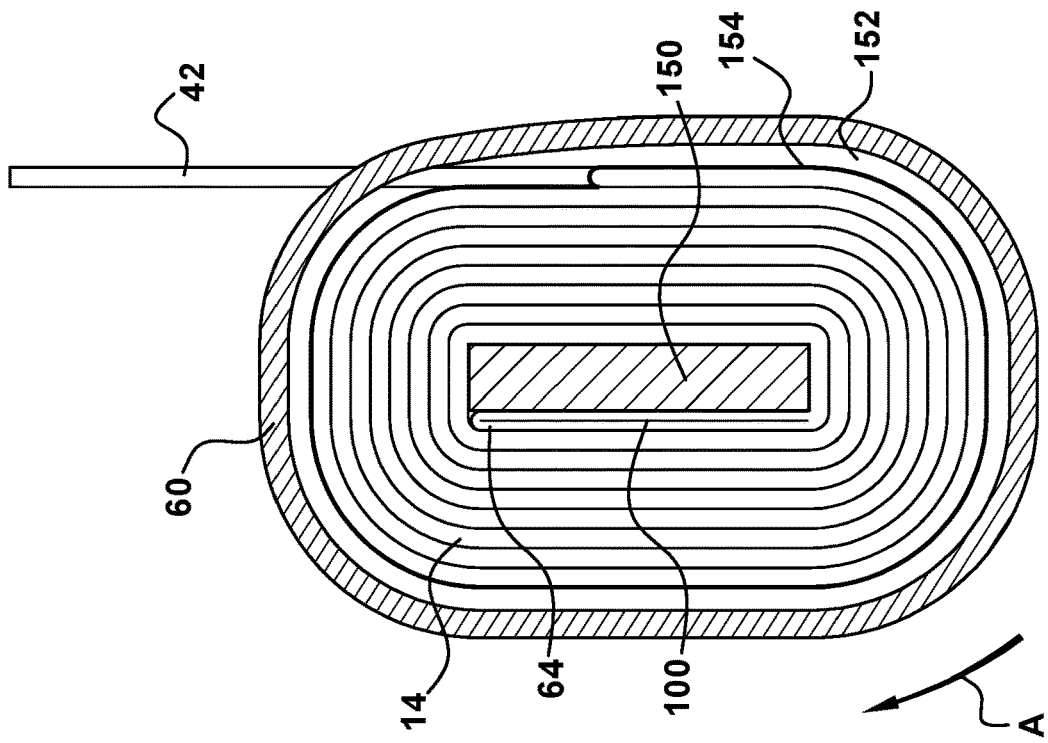
FIG. 5B
FIG. 5A

CURTAIN AIRBAG WITH PACKAGE MAINTAINING STRUCTURE

TECHNICAL FIELD

The invention relates to an apparatus for helping to protect an occupant of a vehicle. More particularly, the invention relates to an apparatus that includes a curtain airbag and a structure for maintaining a small package size.

BACKGROUND

It is known to provide an inflatable vehicle occupant protection device, such as an airbag, for helping to protect an occupant of a vehicle. Airbags are deployable in response to the occurrence of an event for which occupant protection is desired, such as an impact to the vehicle, a vehicle rollover, or a combination thereof. One particular type of airbag is an inflatable curtain or curtain airbag ("curtain airbag") that is inflatable away from the roof of the vehicle between a vehicle occupant and the side structure of the vehicle. A known curtain airbag is inflated from a deflated and stowed condition extending along the vehicle roof rail, at or near the intersection of the side structure of the vehicle and the vehicle roof. The curtain airbag is concealed by the vehicle headliner and trim pieces.

Curtain airbags can have a variety of constructions. For example, a curtain airbag can have a cut-and-sewn construction in which overlying panels are cut to size and interconnected by stitching to form seams that define inflatable chambers between the panels as well as non-inflatable portions outside the chambers. Alternatively, a curtain airbag can have a one piece woven (OPW) construction in which the woven airbag structure has portions or layers woven separately and simultaneously to define inflatable chambers, with portions interwoven to define single layer seams and non-inflatable regions of the OPW curtain airbag. OPW curtain airbags can have stitching added after the bag is woven.

Upon sensing the occurrence of an event for which inflation of the airbag is desired, such as a vehicle collision, a sensor provides a signal to the inflator. Upon receiving the signal from the sensor, the inflator is actuated and provides inflation fluid to the airbag in a known manner. The inflating airbag exerts a force that ruptures, tears, displaces, or otherwise opens the concealing structure (e.g., headliner, trim pieces, padding, etc.), and the airbag inflates toward a fully inflated and deployed condition. The airbag, while in this inflated and deployed condition, helps protect the vehicle occupant from impacts, such as with parts of the vehicle.

Curtain airbags are typically placed in the stored condition by rolling and/or folding. Rolling is, however, typically the primary manner in which curtain airbags are placed in a packaged condition, ready for installation in the vehicle. To aid in the rolling/folding, a tool, such as an elongated rod or bar, is placed either on top of the curtain airbag or in a sleeve formed in the airbag. The curtain airbag is then rolled/folded up with the tool so that the rolled/folded form of the curtain airbag follows that of the tool. Wraps or sleeves can then be placed around the rolled/folded curtain airbag to maintain the airbag in the rolled/folded condition. The tool can then be removed, leaving the curtain airbag in the packaged condition.

The "packaged condition" refers to the curtain airbag in its ready-to-install condition, regardless of whether it is rolled, folded, or a combination of rolled and folded. In the packaged condition, the curtain airbag can also include additional features and/or structures, such as packaging sleeves and/or wraps, installation and/or fastening structures (fasteners, clamps, brackets, etc.), and inflation components, such as inflators, fill tubes, diffusers, etc. Together, the curtain airbag and these additional components make up what is referred to as an airbag package or curtain airbag package which, again, is a ready-to-install component of the vehicle safety system.

When configuring a curtain airbag for a particular vehicle architecture, care is exercised so that the curtain airbag package will fit within the confines of the vehicle structure. These confines are typically defined by the vehicle sheet metal structures (e.g., pillars (A, B, C, D pillars, etc.), the roof, and the roof rail) as well as the interior trim pieces that cover the packaged curtain airbag once installed (e.g., roof liner, pillar trim pieces, and door trim pieces). Again, the space made available by these structures dictates the form factor that the curtain airbag package can take. With space being at a premium, it can be essential for the curtain airbag package to be as small as possible. While the requisite length of the curtain airbag is somewhat fixed, as the curtain airbag has to cover the requisite portion of the length of the vehicle, its dimensions transverse to its length can undergo some degree of control.

For other types of airbags, such as frontal airbags and knee airbags, methods such as compression wraps and thermoforming can be used to control the package size. These methods are not ideal for use with curtain airbags. Curtain airbag packages are large/long and therefore not ideal for being placed in thermoforming ovens. Additionally, thermoforming is a comparatively expensive option for use with curtain airbags. Thus, while thermoforming is a potential option for packaging curtain airbags, it can be impractical due to expense and difficulty. Regarding compression wraps, they often relax over time and quite often are not able to offer the package reduction magnitude that is required. Additionally, wraps lack the ability to enforce a specific shape and instead will conform to whatever shape the rolled/folded airbag had when the wrap was applied.

SUMMARY

An apparatus for helping to protect an occupant of a vehicle includes a curtain airbag having a packaged condition in which the curtain airbag is rolled and/or folded to be installed along a roof rail in a vehicle. The curtain airbag includes a channel feature configured to receive a package maintaining structure configured to enforce a predetermined configuration of the curtain airbag in a packaged condition.

According to one aspect, an apparatus for helping to protect an occupant of a vehicle includes an airbag module including a curtain airbag in a packaged condition in which the curtain airbag is placed in a rolled and/or folded configuration for installation along a roof rail in a vehicle. The curtain airbag can be configured to be inflated and deployed along a side structure of the vehicle structure. The apparatus can also include a package maintaining structure installed in the curtain airbag while in the packaged condition. The package maintaining structure can be configured to distort the rolled and/or folded configuration of the curtain airbag from within the curtain airbag to enforce a shape of the airbag module.

According to another aspect, the curtain airbag can include a channel for receiving the package maintaining structure.

According to another aspect, the channel can be located along a lower edge portion of the curtain airbag.

According to another aspect, the channel can have an opening for receiving the package maintaining structure.

According to another aspect, the opening can be located at a front end of the curtain airbag.

According to another aspect, the airbag can include an extension of the lower edge portion that projects forward from a front edge portion of the airbag, the extension comprising an opening providing access to the channel.

According to another aspect, the opening can have an outward tapered configuration and is angled upward with respect to a length of the channel.

According to another aspect, the extension can include an aperture configured to receive a tool for securing the extension to form a resistance to telescoping of the lower edge portion of the airbag in response to installation of the package maintaining structure into the channel.

According to another aspect, the extension can include an aperture configured to receive a tool for securing the extension to form a resistance to telescoping of the lower edge portion of the airbag in response to removal of a folding bar from the airbag module.

According to another aspect, the opening in the extension can be held closed by at least one of stitching, ultrasonic welding, heat bonding, or adhesives to retain the package maintaining structure in the channel.

According to another aspect, the opening in the extension can include overlying portions that form curved tabs configured to facilitate separating the overlying portions so that the package maintaining structure can be installed in the channel.

According to another aspect, the apparatus can also include wrapping structures configured to extend around the curtain airbag in the rolled and/or folded condition to retain the curtain airbag in the packaged condition and limit expansion of the curtain airbag in the packaged condition.

According to another aspect, due to the wrapping structures limiting expansion of the curtain airbag in the packaged condition, the package maintaining structure can be configured to enforce a shape of the channel and of portions of the curtain airbag rolled and/or folded around the package maintaining structure and the channel.

According to another aspect, the rolled and/or folded curtain airbag can define an inner space configured to receive the package maintaining structure. The package maintaining structure can be configured to have an outer perimeter that is about equal to a perimeter of the inner space so that the rolled and/or folded airbag conforms to the shape of the package maintaining structure when the package maintaining structure is installed.

According to another aspect, the wrapping structure can be configured to have a length that is longer than an outer perimeter of the rolled and/or folded curtain airbag, wherein the rolled and/or folded curtain airbag is configured to unroll and/or unfold to expand into engagement with the wrapping structure.

According to another aspect, the curtain airbag can be a one-piece woven curtain airbag or a cut-and-sewn curtain airbag.

According to another aspect, the apparatus can be included as a component of a vehicle safety system. The vehicle safety system can also include an inflator configured to inflate the curtain airbag and a controller configured to actuate the inflator in response to a vehicle crash condition.

BRIEF DESCRIPTION OF THE DRAWINGS

The foregoing and other features of the invention will become apparent to one skilled in the art to which the invention relates upon consideration of the following description of the invention with reference to the accompanying drawings, in which:

FIG. 1 is a schematic view illustrating a packaged condition of an airbag module of a vehicle safety system in an installed condition in a vehicle.

FIG. 2 is a plan view illustrating an example configuration of a curtain airbag that can be implemented in the airbag module of the vehicle safety system.

FIG. 5A is a section view taken generally along line 5A-5A in FIG. 4B.

FIG. 5B is a section view taken generally along line 5B-5B in FIG. 4B.

DESCRIPTION

Figure 3:
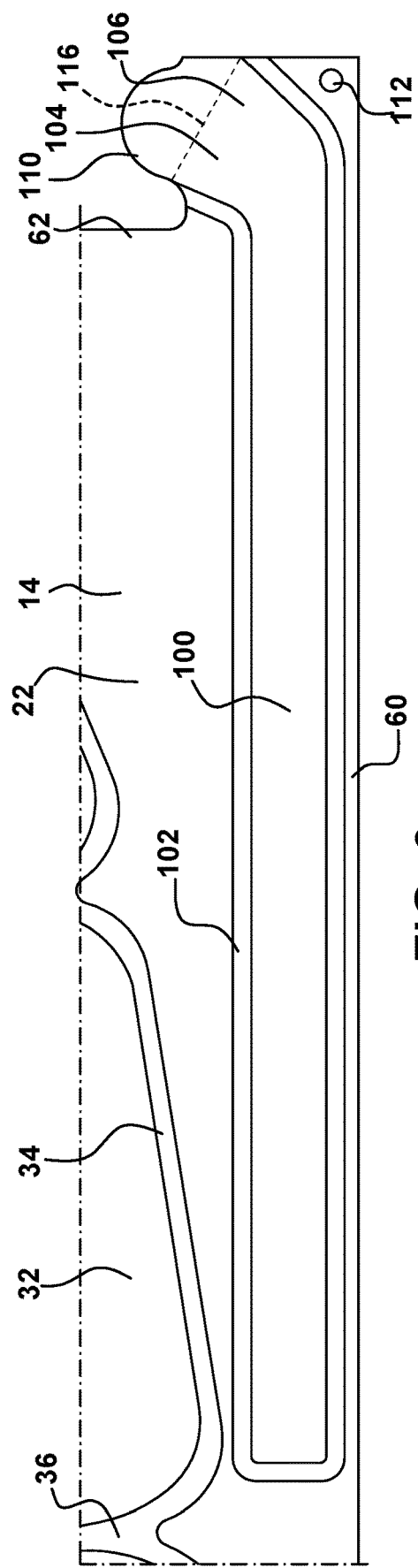
FIG. 3 is a magnified view of a portion of the curtain airbag of FIG. 2.

Referring to FIGS. 1 and 2, a vehicle safety system 10 includes an airbag module 20 for helping to protect an occupant of a vehicle 12. The airbag module 20 includes an inflatable vehicle occupant protection device in the form of a curtain airbag 14.

The curtain airbag 14 can be constructed of any suitable material, such as nylon (e.g., woven nylon 6-6 yarns), and can be constructed in any suitable manner. For example, the curtain airbag 14 can have a one-piece woven (OPW) construction in which the airbag is woven as a single piece of material, with two-layer portions forming overlying panels 22 and single layer portions defining connections or seams 30, 36. As another example, the curtain airbag 14 can include separate overlying panels 22 that are interconnected by known means, such as stitching, ultrasonic welding, heat bonding, or adhesives, to form the connections/seams 30, 36 of the curtain airbag 14. The curtain airbag 14 can be uncoated, coated with a material, such as a gas impermeable urethane, or laminated with a material, such as a gas impermeable film. The curtain airbag 14 thus can have a gas-tight or substantially gas-tight construction. Those skilled in the art will appreciate that alternative materials, such as polyester yarn, and alternatives coatings, such as silicone, can also be used to construct the curtain airbag 14.

The curtain airbag 14 of FIGS. 1 and 2 is just one of various example configurations that can be implemented in the vehicle safety system 10. Airbag configurations can vary greatly from vehicle to vehicle depending on a variety of factors, such as the architecture of the vehicle and the desired degree or extent of airbag coverage. The curtain airbag 14 of FIGS. 1 and 2 does include several features typical of most, if not all, curtain airbags. A peripheral connection 30 defines an inflatable volume 32 of the curtain airbag, which is divided into inflatable chambers 34 by interior connections 36 within the peripheral connection. An inflator mouth 40 is configured to receive an inflator 50 (see FIG. 1) so that inflation fluid can be directed from the inflator into the inflatable volume 32.

A series of mounting tabs 42, each of which can include one or more mounting apertures 44, are spaced along an upper edge 68 of the curtain airbag 14 and facilitate connecting the airbag and the airbag module 20 to the vehicle 12. Typically, the airbag module is connected to the vehicle at or near the intersection of a side structure 16 of the vehicle and the vehicle roof 18, above the vehicle doors and side windows (not shown). The airbag module 20 can, for example, be mounted to a roof rail of the vehicle 12. When inflated, the curtain airbag 14 is positioned between the side structure 16 and the vehicle occupants, and extends along the length of the vehicle 12.

In the installed condition of FIG. 1, the airbag module 20 includes the curtain airbag 14 in a packaged condition, along with the inflator 50, which is secured in the inflator mouth 40 in a known manner, such as a via a clamp (not shown). The inflator 50 can be of any known type, such as stored gas, solid propellant, augmented, or hybrid. The inflator 50 is operatively connected, e.g., via lead wires, to an airbag controller 52 configured to actuate the inflator in response to sensing the occurrence of an event for which occupant protection is desired, such as a collision or rollover event.

The airbag module 20 includes the curtain airbag 14 in a deflated, flattened, and rolled and/or folded condition. This can be done, for example, by rolling and/or folding a lower edge portion of the curtain airbag 14 (as viewed in-FIG. 2) upward toward an upper edge of the airbag. This places the curtain airbag 14 in the packaged condition, with the airbag module 20 being ready for installation. By "package" or "packaged," it is meant that the curtain airbag 14 is maintained rolled and/or folded in the stored condition so that the airbag module 20 can be installed in the vehicle 12 as a unit.

In the packaged condition, the rolled/folded condition of the curtain airbag 14 can be maintained by wrapping structures, such as tape, straps, wraps, tethers, or sheaths that are rupturable to release the airbag to deploy in response to inflation. Example wrapping structures 60 are shown in FIG. 1. The wrapping structures 60 are typically formed separately from the curtain airbag 14 and attached during assembly. The wrapping structures 60 could, however, be formed as integral portions of the curtain airbag 14.

The wrapping structures 60 can have a variety of constructions. For example, the wrapping structures 60 can be OPW fabric structures that are slid over the rolled curtain airbag 14 and positioned along its length. As another example, the wrapping structures 60 can be tape wrapped around the rolled curtain airbag 14 and fastened via its adhesive backing. As another example, the wrapping structures 60 can be woven fabric structures, such as strips that are cut and sewn to form loops. As a further example, the wrapping structures 60 can be non-woven fabric structures, such as strips that are cut and secured via adhesives or welds to form loops.

In the installed condition, the airbag module 20 is secured to the structure of the vehicle 12 via the mounting tabs 42, e.g., by fasteners (not shown) installed through the apertures 44 in the mounting tabs. Because the airbag module 20 includes a curtain airbag 14, the structure to which the module is connected is at or near the intersection of a roof 18 of the vehicle 12 and a side structure 16 of the vehicle. Examples of the structure to which the airbag module 20 can be connected includes the side structure 16, the roof 18, or portions thereof, such as a roof rail or a pillar (A, B, C, D, etc.).

In the installed condition, the airbag module 20 is concealed behind trim pieces, such as a roof liner, roof rail trim piece, or pillar trim piece. Often, the space available between the trim piece and the vehicle structure is limited, so that size of the packaged airbag 14 becomes extremely important. Accordingly, the airbag module includes features that help produce and maintain a desired packaged configuration of the airbag module 20, or at least portions thereof. By "packaged configuration," it is meant that the airbag 14 and/or airbag module 20 includes features that help produce and maintain a desired shape and dimensions of the airbag module 20 or a portion thereof.

The curtain airbag 14 includes features configured to help package the airbag so that the airbag, or portions thereof, maintain a desired packaged configuration. More specifically, the curtain airbag 14 includes a channel 100 configured to receive a package maintaining structure 120 (see, especially, FIGS. 1, 4C, and 4D), which is configured to help produce and maintain a desired packaged configuration of the curtain airbag. In the example configuration of FIG. 2, the channel 100 is formed along a lower edge portion 64 of the curtain airbag 14 at a front edge portion 62 of the airbag. The location and extent of the channel 100 coincides with a portion of the curtain airbag 14 for which maintaining a small package size is important. For instance, the location and extent of the channel 100 can coincide with a portion of the airbag module 20 that, when installed, is positioned behind a trim piece of an A-pillar, where the available space might be limited.

As shown in FIGS. 2 and 3, the channel 100 is defined by a connection 102 of the overlying panels 22 of the curtain airbag 14. The connection 102 is generally rectangular in form, which yields the channel 100 as being an envelope of overlying portions of the panels 22. A mouth 104 of the channel 100 provides access to the interior of the channel, allowing for the insertion of the package maintaining structure. In the example configuration of FIGS. 1-3, the mouth 104 is formed in an extension 106 of the curtain airbag 14 that extends forward from the front edge 70 of the curtain airbag 14.

As best shown in FIG. 3, the mouth 104 is defined by portions of the connection 102 that extend slightly upward at an angle relative to the length of the curtain airbag 14. The portions of the connection 102 defining the mouth 104 can also taper outward, diverging slightly, as shown. Curved tabs 110 formed at the mouth 104 allow for separation of the airbag panels 22 to facilitate access to the channel 100. The extension 106 also includes an opening 112 for facilitating the use of folding bar(s) when packaging the curtain airbag 14.

The location and extent of the channel 100 can vary, depending on where along the length of the airbag module 20 it is desired to control the package size. For example, it might be desirable to control the package size along the entire length of the airbag module 20, so that channel 100 can be configured to extend the length of the curtain airbag 14. As another example, it might be desirable to control the package size of the airbag module 20 along a rear portion of the curtain airbag 14, so the channel 100 can be configured to extend along the rear portion of the curtain airbag 14, e.g., intersecting with the rear edge portion 66 of the curtain airbag. As a further example, it might be desirable to control the package size of the airbag module 20 along more than one portion of the curtain airbag 14, so there could be multiple channels 100, each including a package maintaining structure 120 or, alternatively, a single channel and a single package maintaining structure where the channel and/or structure are configured to control the package size only in those portions of the airbag module.

The manner in which the channel 100 and package maintaining structure 120 control the package size of the curtain airbag 20 is best understood when explained in conjunction with the method or procedure by which the curtain airbag 14 is placed in the packaged condition. This method/procedure is shown in FIG. 6 and can be described in conjunction with FIGS. 4A-4D and FIGS. 5A-5E.

Figure 6:
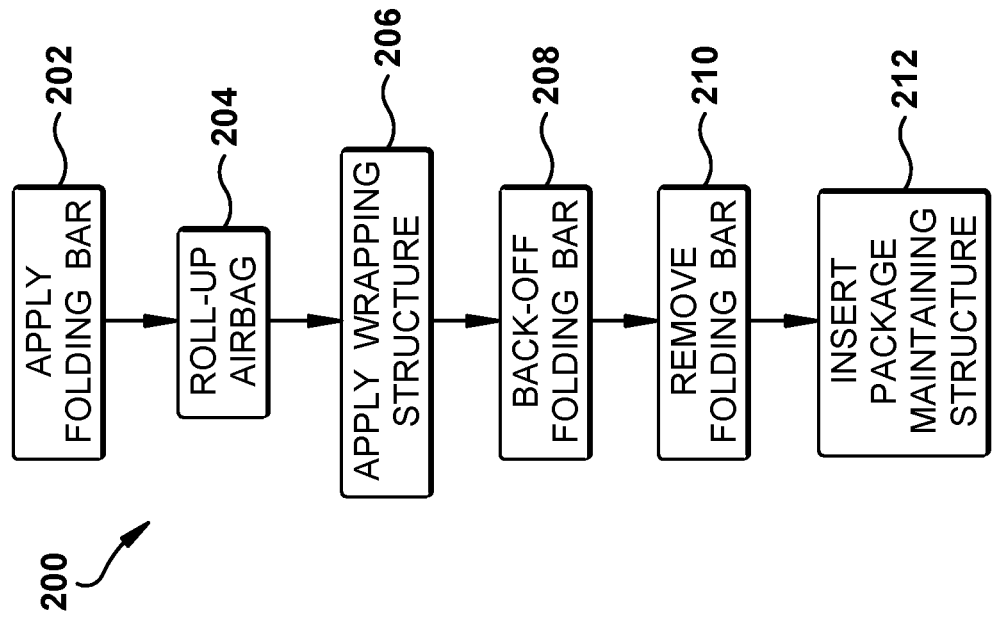
FIG. 6 is a diagram illustrating a method for placing the curtain airbag in the packaged condition.

Referring to FIG. 6, a procedure or method 200 for placing the curtain airbag 14 in the packaged condition includes the step 202 of applying the folding bar 150. To do this, referring to FIG. 4A, the curtain airbag is laid flat, for example, on an assembly table, and a folding/rolling aid, such as a folding bar 150 is positioned on top of the curtain airbag 14, for example, at or along the lower edge portion 64 of the curtain airbag. At step 204, the curtain airbag 14 is rolled/folded around the folding bar 150, as indicated generally by the curved arrow labeled A in FIG. 4A. In doing so, the folding bar 150 allows the curtain airbag 14 to be rolled closely and tightly around the bar in a consistent and uniform manner. The dimensions of the folding bar 150, which can, for example, have a rectangular cross-section, can be selected so that the rolled/folded curtain airbag 14 assumes a desired dimensional configuration.

Figure 4A:
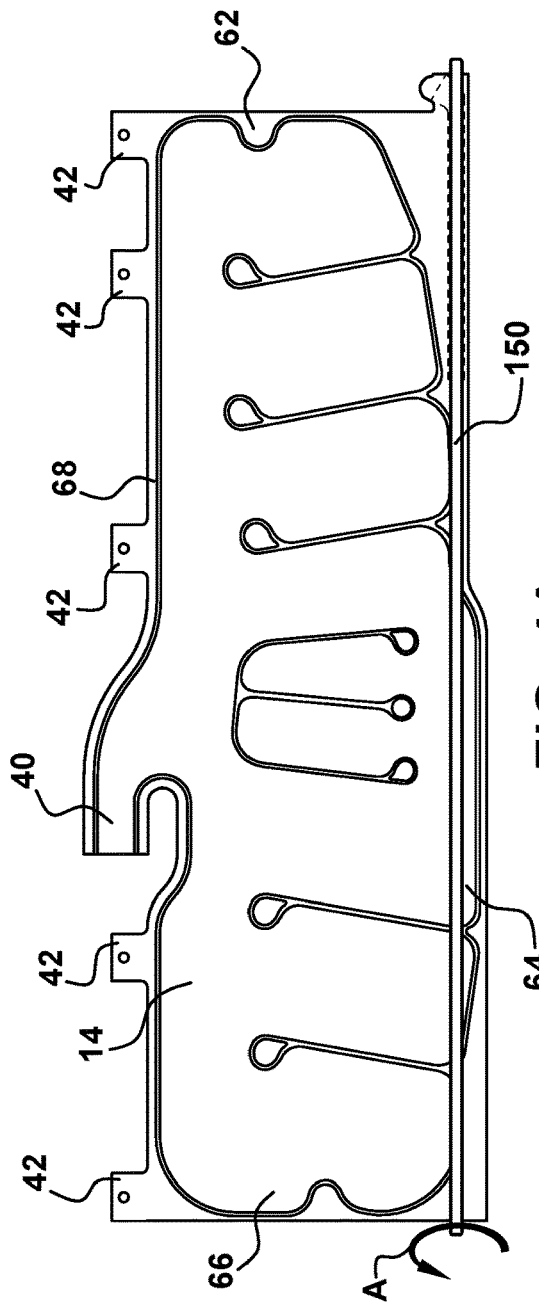
FIGS. 4A-4D illustrate a procedure by which the curtain airbag is placed in a packaged condition during assembly of the airbag module.
Figure 4B:
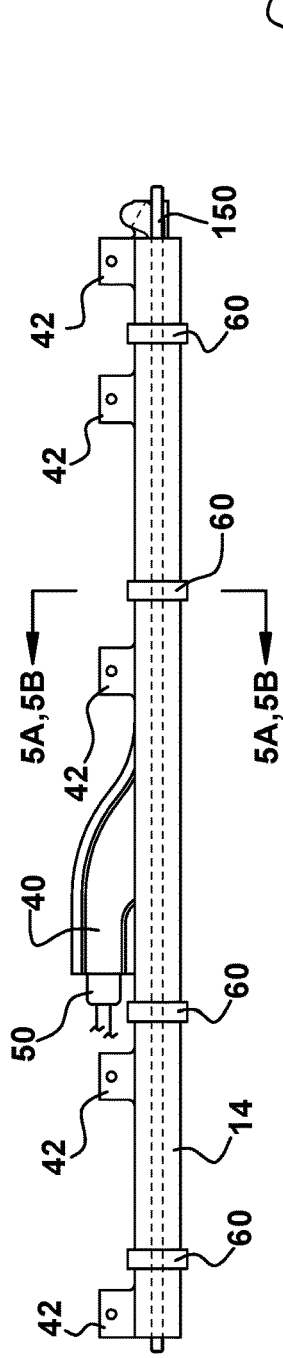
Figure 4C:
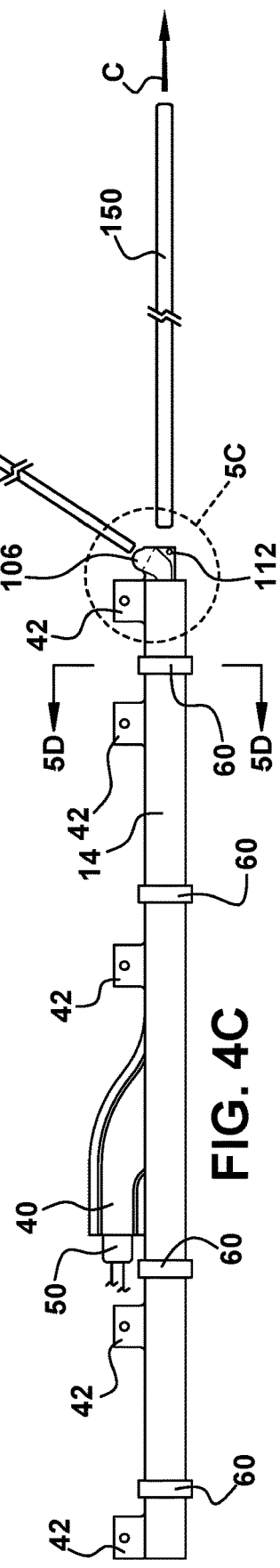
Figure 4D:
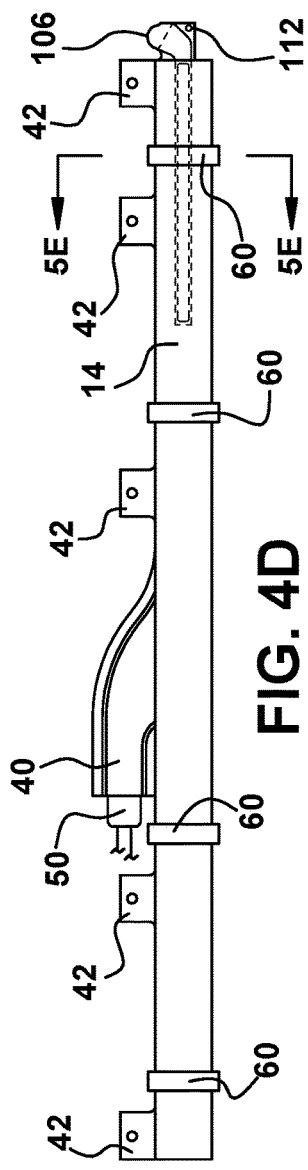

When the rolling/folding is completed, the curtain airbag 14 is left in the condition illustrated in FIG. 4B, with the folding rod 150 positioned in the center of the rolled/folded airbag. The folding rod 150 is tightly held in this position due to the tight roll/fold of the curtain airbag 14. It is at this stage that the wrapping structures 60 are applied, as shown at step 206. The condition of the curtain airbag 14 and the wrapping structures 60 when step 206 is completed is shown in FIG. 5A. It should be noted here that the wrapping structure does not fit tightly around the rolled curtain airbag 14 and, thus, a gap 152 is formed between the outer surface 154 of the rolled airbag and the wrapping structure 60.

At step 208, the folding bar 150 is backed off, that is rotated in the unrolling direction, as indicated generally by the arrow labeled B in FIG. 5B. As a result of this backing off, the tightness of the rolled curtain airbag 14 is loosened such that the outer surface 154 expands into engagement with the wrapping structures 60, as shown in FIG. 5B. In the example configuration illustrated in the figures, the folding rod 150 is backed off a quarter turn, i.e., 90 degrees. Depending, however, on the desired configuration of the packaged curtain airbag 14, the backing off of the folding rod 150 can be up to two full turns or more.

Due to the loosening of the rolled curtain airbag 14 and the accompanying expansion of the outer surface 154 when the folding rod 150 is backed off, a space 156 (see FIG. 5B) is opened up around the folding rod. At step 210, the folding bar 150 is removed from the rolled curtain airbag 14, with the loosened airbag roll and the resulting space 156 facilitating an easy, smooth removal. When the folding bar is removed, the rolled curtain airbag 14 can have the tendency to "telescope," that is, have one or more inner coils of the rolled/folded curtain airbag pulled out due to friction with the folding rod. Such telescoping can destroy the roll/fold of the curtain airbag 14.

Figure 5D:
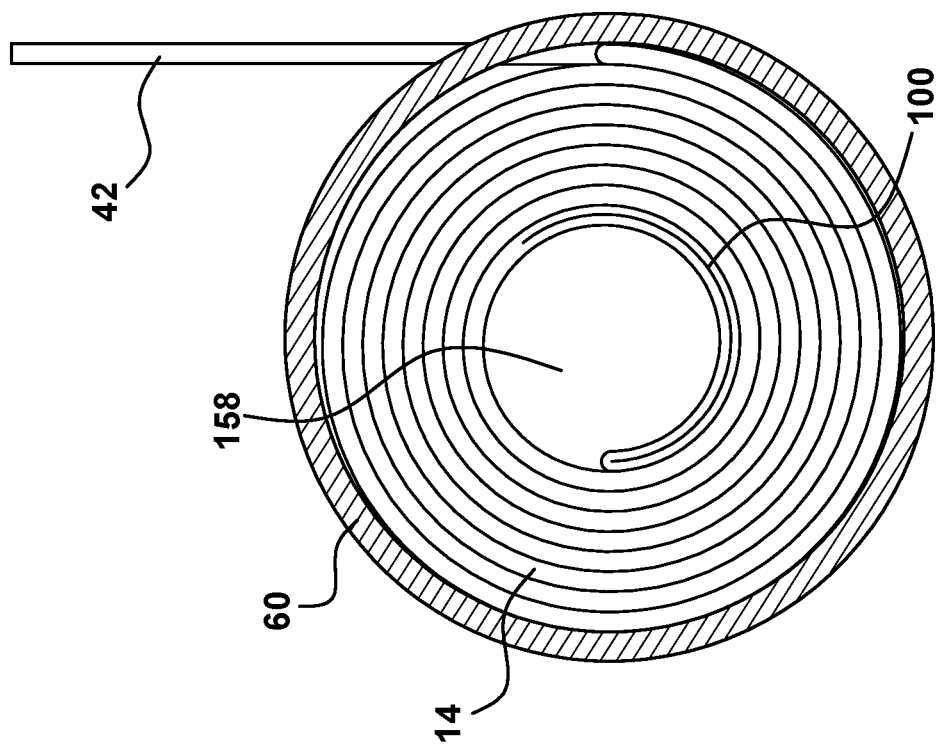
FIG. 5D is a section view taken generally along line 5D-5D in FIG. 4C.
Figure 5C:
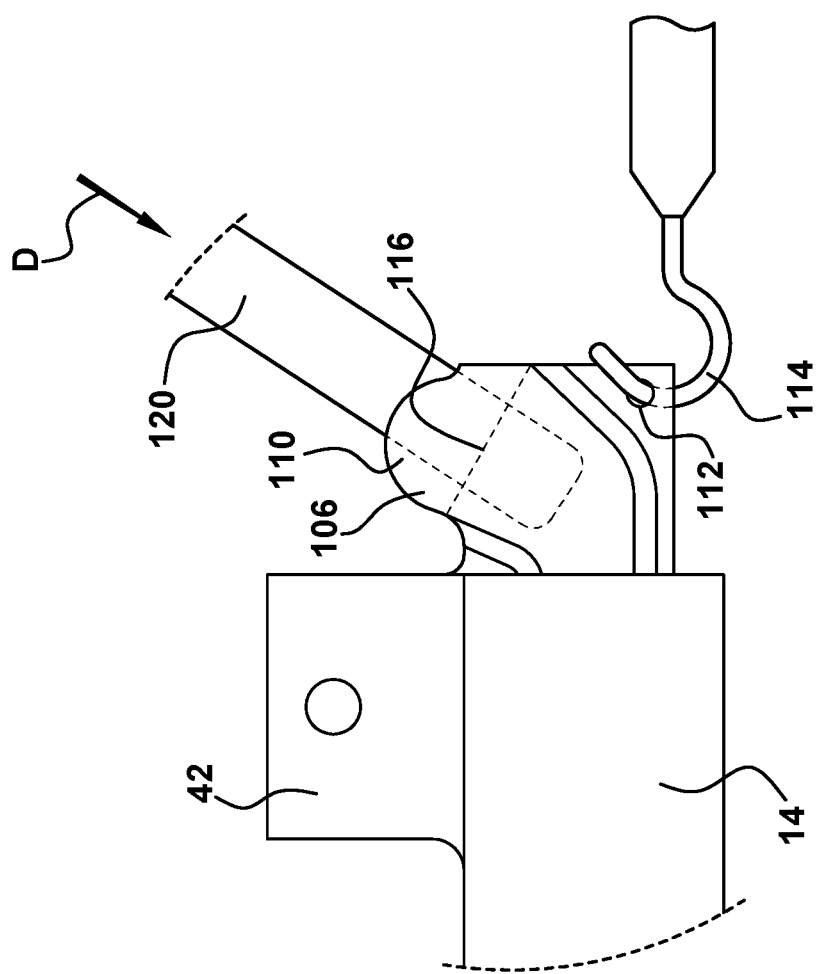
FIG. 5C is a magnified view of a portion of the airbag module illustrated generally at line 5C in FIG. 4C.

To combat against telescoping, the opening 112 of the extension 106, which, due its extending forward from the front edge of the curtain airbag 14, is positioned axially beyond the end of the rolled/folded curtain airbag. As such, a tool 114, such as a hook, can be hooked through the opening 112 and used to secure the extension 106. This is shown in the detail of FIG. 5C. The tool 114 can, for example, be a fixture mounted on the assembly table. With the lower edge portion 64 of the curtain airbag 14, which is at the innermost portion of the roll/fold, i.e., interfacing with the folding rod 150, the portion of the curtain airbag that directly engages the folding rod is secured by the hook 114. Because of this, when the folding rod 150 is removed from the end of the curtain airbag 14 opposite the extension 106, as indicated generally by the arrow labeled C in FIG. 4C, the hook 114 secures the curtain airbag against telescoping out of the roll/fold.

The wrapping structures 60 and/or the folding rod 150 can be configured to promote the use of the package maintaining structure 120. When the curtain airbag 14 is rolled-up around the folding rod 150 and the wrapping structures 60 are applied, the resulting structure is shown in FIG. 5A. As shown, when rolled around the generally rectangular (in cross-section) folding rod 150, curtain airbag 14 takes on a generally rounded, rectangular shape. This shape is owed to the wrapping structures 60 maintaining the curtain airbag 14 wrapped around the rectangular folding rod 150. Once the folding rod 150 is removed, however, the curtain airbag 14 and the wrapping structures 60 revert to a round configuration due to the curtain airbag and wrapping structures tendency to move to a least stressed condition. This is shown in FIG. 5D Referring to step 210, once the folding rod 150 is removed, the package maintaining structure 120 is installed, as indicated generally by the arrow labeled D in FIG. 4C. The package maintaining structure 120 can be configured to form a close and tight fit within the channel 100. Because of this, there is a risk of the rolled/folded curtain airbag 14 telescoping or otherwise becoming displaced in the direction that the package maintaining structure 120 is inserted. Advantageously, the hook 114 can secure the extension 106 against such displacement by anchoring the lower edge portion 64 of the curtain airbag 14.

The package maintaining structure 120 and the channel 100 are configured so that, when the package maintaining structure is installed, the space 158 in the center of the rolled curtain airbag 14 (see FIG. 5E) is completely or substantially filled by its structure. Because of this, the rolled curtain airbag 14 takes the shape of the package maintaining structure 120 which, in the example configuration, is rectangular. Because the rolled curtain airbag 14 is constrained by the wrapping structures 60, both the airbag and the wrapping structures follow or conform to the cross-sectional shape of the package maintaining structure 120. The package maintaining structure 120 thus enforces the generally rectangular configuration of the rolled curtain airbag 14 shown in FIG. 5E, and thereby facilitates installation in the vehicle within the requisite space.

The package maintaining structure 120, when installed in the curtain airbag 14, becomes a component of the airbag module 20 that is installed in the vehicle 12. The package maintaining structure 120 thus remains installed in the channel 100 so that the shape of the packaged curtain airbag 14/airbag module 20 is maintained even after the module is installed in the vehicle 12. Maintaining the shape of the curtain airbag 14/airbag module 20 is important so that the trim pieces that cover and conceal the airbag module 20 can be installed.

The package maintaining structure 120 can have a variety of material constructions. Owing to its purpose of being permanently installed in the curtain airbag 14 to maintain the shape of the packaged airbag/airbag module 20, the package maintaining structure 120 is configured to be both strong and light weight so that it can perform its shape maintaining purpose while, at the same time, not contributing a significant degree of the energy to the deploying airbag. The package maintaining structure can, for example be formed of a plastic/polymer material, such as nylon, polyester, PET, PVC, HDPE, etc.

The curtain airbag 14, specifically the portions forming the channel 100 and extension 106, includes features that help maintain the position of the package maintaining structure 120 in the channel 100, once installed. First, the opening 104 is angled with respect to the length of the channel 100 and is configured so that installation of the package maintaining structure 120 requires that the extension 106 be displaced in order to insert the package maintaining structure. The tapered configuration of the connection 102 at the opening 104 eases installation of the package maintaining structure 120, but the angled configuration of the opening still must be overcome. Once the package maintaining structure 120 is installed, the angled opening helps prevent it from unintended removal from the channel 100. For an even more secure fit, stitching, ultrasonic welding, heat bonding, or adhesives can be applied to the extension 106 across the opening 104 to seal the package maintaining structure 120 inside, as indicated generally at line 116.

Figure 7:
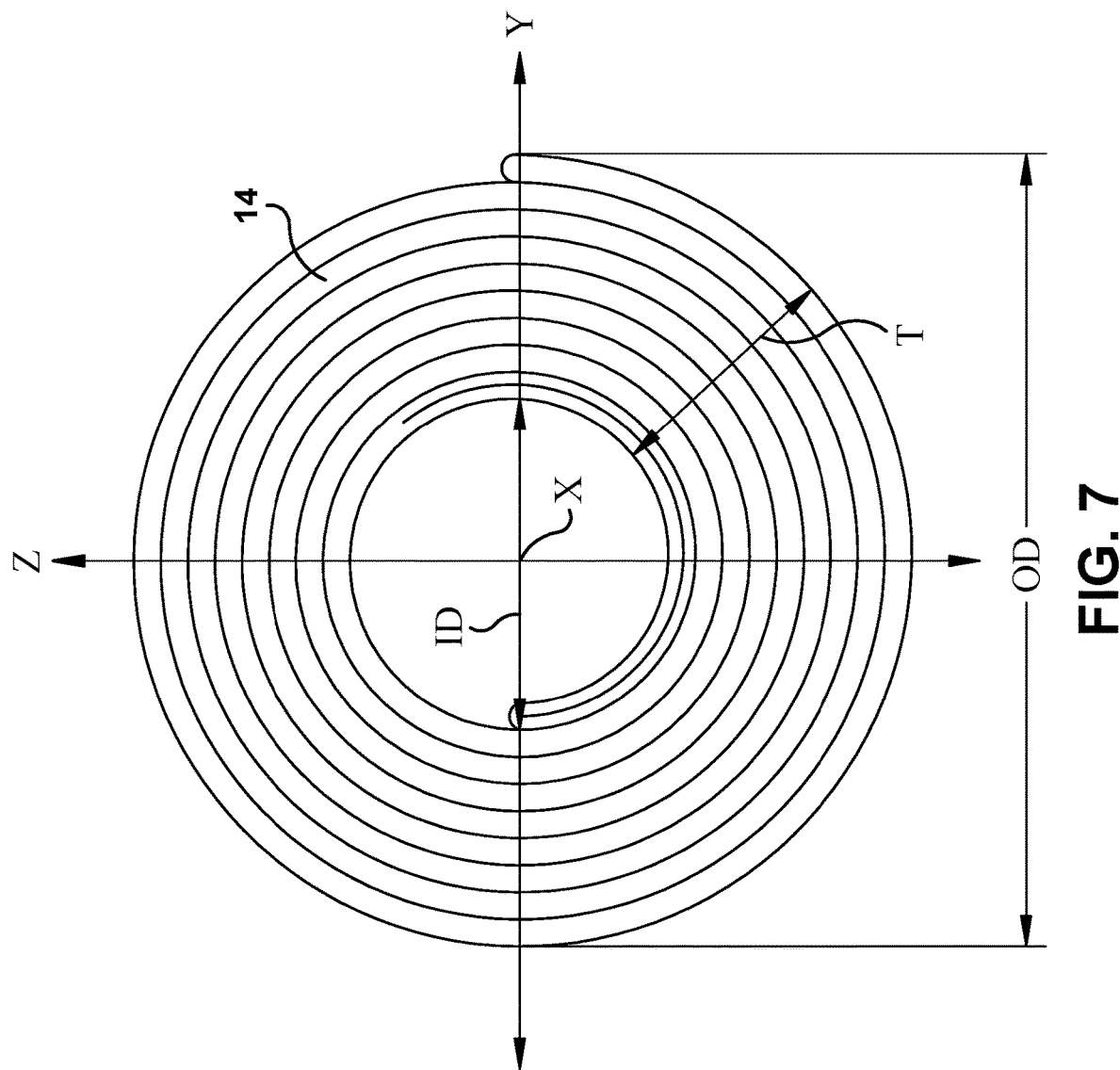
FIG. 7 is a schematic view illustrating the dimensional characteristics utilized in the design of the airbag module.

The dimensions of the package maintaining structure 120 and the channel 100 are calculated based on a desired dimension or dimensions of the curtain airbag 14 in the packaged condition. An example of this is shown in FIG. 7. Referring to FIG. 7, the curtain airbag 14 is rolled with a roll tightness commensurate with an example curtain airbag installation. In this rolled configuration, the rolled curtain airbag 14 has an inner dimension or diameter ID and an outer dimension or diameter OD. In this description, the term "diameter" is used to describe the dimensions of the curtain airbag 14 because the rolled/folded airbag is considered in an ideally circular roll configuration, which facilitates the circumference/perimeter calculations and other determinations described herein. Those skilled in the art will appreciate that this approach is not affected by the fact that the curtain airbag 14 can, and likely will, be distorted when/while being placed in the packaged condition. A "circumference" dimension of a distorted, non-circular roll is simply better described as a "perimeter" dimension of the roll, which remains equal to the calculated circumference of the circular roll. This is because the wrapping structures 60 fixes the roll, limiting its expansion despite any distortions to the shape of the roll. Thus, while the ID/OD values are determined/described with this circular configuration of FIG. 7 in mind, the validity/accuracy of these values is maintained even when considering the possibility/probability of a non-circular configuration in practice. The Table below illustrates calculations performed in sizing the package maintaining structure 120, with dimensions in millimeters (mm):

| Rolled Curtain Airbag | | | Package maintaining structure | | | Package Y Dimensions | | |
| --- | --- | --- | --- | --- | --- | --- | --- | --- |
| OD | ID | $C_{ID}$ | W | H | P | Fabric | Maintainer | Total |
| 30 | 18 | ≈56 | 2 | 26 | ≈56 | 12 | 2 | 14 |

FIG. 7 illustrates the rolled curtain airbag 14 with reference to an X, Y, and Z axis. The identity of these axes is not particularly important, although they can, for convenience, correspond to the typical XYZ axis identifications for a vehicle, namely, that the X axis corresponds to the vehicle length, the Y axis corresponds to the vehicle width, and the Z axis corresponds to the vehicle height. For a particular vehicle configuration, the desired thickness of the packaged curtain airbag might be 14 mm in the Y axis dimension. Referring to the example configuration illustrated in the above table and to FIG. 7, in the rolled condition, the OD is 30 mm and the ID is 18 mm. This leaves a rolled fabric thickness, identified generally at T in FIG. 7, of 6 mm. Thus, to achieve the desired 14 mm package thickness in the Y-direction, the thickness of the package maintaining structure is 2 mm, so that the 6 mm rolled fabric thickness T on each side of the package maintaining structure, plus the 2 mm thickness of the structure itself, yields the 14 mm total.

Since the ID of the rolled curtain airbag is fixed at 18 mm, it is known that the circumference of the ID ($C_{ID}$) is ≈56 mm, and that this circumference should be about equal to the perimeter (P) of the package maintaining structure 120. If the ID circumference $C_{ID}$ is configured to correspond to or be about equal to the perimeter of the package maintaining structure 120, then the package maintaining structure, when inserted into the channel 100, will force the ID of the curtain airbag 14 to conform to the cross-sectional shape of the package maintaining structure. By simple math, a package maintaining structure that is 2 mm in width (W) and 26 mm in height (H) has a perimeter of 56 mm. Thus, the 2×26 mm package maintaining structure will fit precisely within the ID of the rolled curtain airbag 14 and cause it to conform to its shape, yielding the desired package thickness of 14 mm.

To ensure that the desired dimensions of the airbag module 20 result from the installation of the package maintaining structure 120, the dimensions of the channel 100 can also be configured to correspond to or be about equal the ID circumference $C_{ID}$ of the rolled curtain airbag 14. Doing this provides a channel 100 for receiving the package maintaining structure 120 so that its installation in the rolled curtain airbag 14 does not interfere with the rolled structure, e.g., by avoiding telescoping. Just as importantly, dimensioning the channel 100 in this manner helps ensure that the assembly of the airbag module 20 (e.g., according to the method 200 of FIG. 6) goes as planned. Since the channel 100 is configured for a snug/tight fit with the package maintaining structure 120, and since the fit between the package maintaining structure and the ID of the rolled curtain airbag 14 is configured to be equally as snug/tight, any looseness or play in the rolled curtain airbag around the package maintaining structure when installed in the channel will be indicative of an error.

Of course, the perimeter of the package maintaining structure 120 cannot be configured to be exactly equal to the ID circumference $C_{ID}$. There must be some tolerance applied to the fit between the channel 100 and ID of the rolled curtain airbag 14 to allow for installation and assembly of the airbag module 20. The addition of a tolerance configured so that the airbag module 20 can be assembled, while still producing the desired resulting cross-sectional shape, can be implemented.

In the example configuration illustrated in the figures, the package maintaining structure 120 is formed as an elongated member, such as a rod, with a generally rectangular cross-section. The edges/corners of the package maintaining structure 120 can be chamfered or rounded so as to reduce sharp edges that can cut or damage the airbag material, especially in a close-fit configuration. Additionally, to help facilitate insertion of the package maintaining structure 120 into the channel in these close-fit configurations, the package maintaining structure can include a tapered or rounded end portion 122 that can guide the structure into the channel.

Figure 5E:
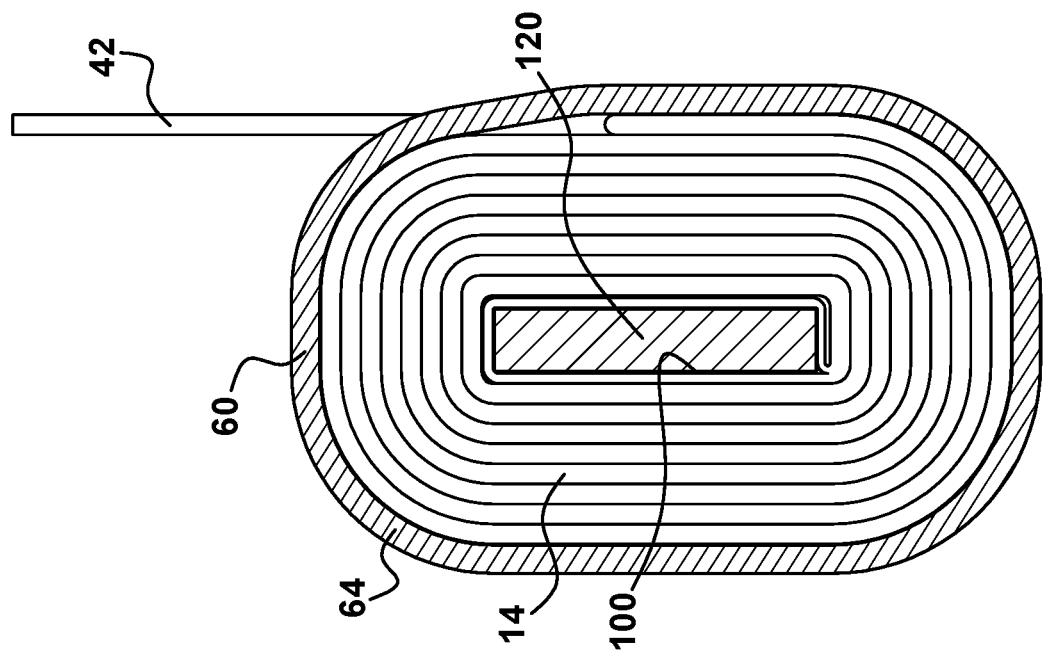
FIG. 5E is a section view taken generally along line 5E-5E in FIG. 4D.

The cross-sectional views of FIGS. 5D-5E illustrate how the package maintaining structure 120 functions along with the channel 100 to shape the packaged curtain airbag 14/airbag module 20. FIG. 5D shows the curtain airbag 14 in the rolled/folded condition, with the wrapping structure 60 securing the airbag in the tightly formed manner achieved by the folding rod 150, which has since been removed. Without any structure to define the shape of the packaged curtain airbag 14/airbag module 20, it is free to assume whatever shape dictated by the properties of the rolled/folded structure and/or any applied external forces. By way of example, the shape of the packaged curtain airbag 14/airbag module 20 is generally circular in cross-section.

In the rolled/folded condition, the lower edge portion 64 of the curtain airbag 14, and thus the channel 100, is positioned at the innermost portion of the roll/fold. The cross-sectional dimensions of the channel 100 are configured so that the package maintaining structure 120 is just able to fit inside the channel. As a result, as shown in FIG. 5E, installation of the package maintaining structure 120 distorts the rolled/folded condition of the curtain airbag 14/airbag module 20, forcing the channel 100 and the surrounding curtain airbag/airbag module to conform to the shape of the package maintaining structure.

Because the wrapping structures 60 limit and maintain the overall diameter of the packaged curtain airbag 14/airbag module 20, when the channel 100 conforms to the cross-sectional shape of the package maintaining structure 120, the rolled/folded curtain airbag follows. In the example configuration illustrated in FIG. 5E, the package maintaining structure 120 has a generally rectangular cross-section, and the channel 100, curtain airbag 14, and airbag module 20 conform to that shape. As a result, the packaged curtain airbag 14 and the airbag module 20, are shaped by the channel 100 and package maintaining structure 120, and that shape is maintained throughout installation and after the airbag module is installed.

From this, it will be appreciated that the shape of the packaged curtain airbag 14 and the airbag module 20 can be controlled through the configurations of the channel 100 and the package maintaining structure 120. Not only can the shape be controlled as shown in the cross-sectional dimensions as shown in the example configuration, the directional extent of the packaged curtain airbag 14 and airbag module 20 can also be controlled. For example, the packaged curtain airbag 14 and airbag module 20 could be made to follow a curvilinear path by forming the package maintaining structure 120 with a curved configuration. Forming the channel 100 with a corresponding curved configuration could aid in maintaining the shape of the packaged curtain airbag 14/airbag module 20. As another example, the packaged curtain airbag 14 and airbag module 20 could be made to have a twist or angular form by forming the package maintaining structure 120 with twisted or angled segments.

From the above description of the invention, those skilled in the art will perceive improvements, changes and modifications. Such improvements, changes and modifications within the skill of the art are intended to be covered by the appended claims.

We claim:

1. An apparatus for helping to protect an occupant of a vehicle, comprising:
    an airbag module including a curtain airbag in a packaged condition in which the curtain airbag is placed in a rolled and/or folded configuration for installation along a roof rail in a vehicle, the curtain airbag being configured to be inflated and deployed along a side structure of the vehicle;
    a package maintaining structure installed in the curtain airbag while in the packaged condition, the package maintaining structure being configured to distort the rolled and/or folded configuration of the curtain airbag from within the curtain airbag to enforce a shape of the airbag module;
    wherein the curtain airbag comprises a channel for receiving the package maintaining structure, the channel extending along a lower edge portion of the curtain airbag and comprising an opening that provides access to the channel for installing the package maintaining structure in the channel, the opening having an outward tapered configuration and being angled upward with respect to a length of the channel.

2. The apparatus recited in claim 1, wherein the opening is located at a front end of the curtain airbag.

3. The apparatus recited in claim 1, wherein the airbag comprises an extension of the lower edge portion that projects forward from a front edge portion of the airbag, the extension comprising the opening.

4. The apparatus recited in claim 3, wherein the extension comprises an aperture configured to receive a tool for securing the extension to form a resistance to telescoping of the lower edge portion of the airbag in response to installation of the package maintaining structure into the channel.

5. The apparatus recited in claim 3, wherein the extension comprises an aperture configured to receive a tool for securing the extension to form a resistance to telescoping of the lower edge portion of the airbag in response to removal of a folding bar from the airbag module.

6. The apparatus recited in claim 3, wherein the opening in the extension is held closed by at least one of stitching, ultrasonic welding, heat bonding, or adhesives to retain the package maintaining structure in the channel.

7. The apparatus recited in claim 3, wherein the opening in the extension comprises overlying portions that form curved tabs configured to facilitate separating the overlying portions so that the package maintaining structure can be installed in the channel.

8. The apparatus recited in claim 1, further comprising wrapping structures configured to extend around the curtain airbag in the rolled and/or folded configuration to retain the curtain airbag in the packaged condition and limit expansion of the curtain airbag in the packaged condition.

9. The apparatus recited in claim 8, wherein, due to the wrapping structures limiting expansion of the curtain airbag in the packaged condition, the package maintaining structure is configured to enforce a shape of the channel and of portions of the curtain airbag rolled and/or folded around the package maintaining structure and the channel.

10. The apparatus recited in claim 8, wherein the rolled and/or folded curtain airbag defines an inner space configured to receive the package maintaining structure, wherein the package maintaining structure is configured to have an outer perimeter that is about equal to a perimeter of the inner space so that the rolled and/or folded airbag conforms to the shape of the package maintaining structure when the package maintaining structure is installed.

11. The apparatus recited in claim 8, wherein the wrapping structures are configured to have a length that is longer than an outer perimeter of the rolled and/or folded curtain airbag, wherein the rolled and/or folded curtain airbag is configured to unroll and/or unfold to expand into engagement with the wrapping structures.

12. The apparatus recited in claim 1, wherein the curtain airbag is a one-piece woven curtain airbag or a cut-and-sewn curtain airbag.

13. A vehicle safety system comprising:
   the apparatus recited in claim 1;
   an inflator configured to inflate the curtain airbag; and
   a controller configured to actuate the inflator in response to a vehicle crash condition.

14. The apparatus recited in claim 1, wherein the curtain airbag further comprises an aperture located adjacent the opening and configured to receive a tool for securing the curtain airbag to form a resistance to telescoping of the airbag in response to removal of a folding bar from the airbag module.

* * * * *